Aug. 5, 1969 TAKAAKI KUROKAWA ET AL 3,459,290

PLATE CONVEYOR

Filed May 19, 1967

United States Patent Office 3,459,290
Patented Aug. 5, 1969

3,459,290
PLATE CONVEYOR
Takaaki Kurokawa, Chigasaki-shi, and Noboru Inoue, Funabashi-shi, Japan, assignors to Tokyo Shibaura Denki Kabushiki Kaisha, Horikawa-cho, Kawasaki-shi, Kanagawa-ken, Japan, a joint-stock company of Japan
Filed May 19, 1967, Ser. No. 639,700
Claims priority, application Japan, Sept. 30, 1966, 41/91,701
Int. Cl. B65g 17/06
U.S. Cl. 198—189                2 Claims

ABSTRACT OF THE DISCLOSURE

A plate conveyor is fabricated by interconnecting a plurality of chain links to form a chain. Each link is provided with a supporting member for a removable unit plate including means to receive one end thereof and a spring biased locking member to lock the unit plate in position.

---

This invention relates to a plate conveyor and more particularly to an improved unit plate supporting member employed to fabricate a plate conveyor.

Endless plate conveyors are used in a variety of applications. For example, in the so-called ribbon type glass bulb blowing machine, a stream of molten glass supplied from an orifice through the bottom of a glass melting furnace is pressed into a ribbon-shaped glass blank by means of a pair of feed rollers, and, while the glass blank is being conveyed along a predetermined path by means of a plate conveyor, parisons are formed by a plurality of blowheads travelling above the plate conveyor in synchronism therewith. These parisons depending from the plate conveyor are moulded into glass bulbs by means of rotating moulds travelling beneath the conveyor also in synchronism therewith.

The plate conveyor is fabricated by a plurality of identical unit plates each including an opening through which a parison is formed by the action of a blowhead brought into contact with the upper portion of the glass blank and is conveyed in synchronism with the glass blank.

As is well known in the art, the dimension and configuration of the parison should be selected dependent upon the dimensions and configuration of the glass bulbs to be manufactured. Consequently, it is necessary to replace different unit plates having different openings for bulbs of different rating and configuration.

However, as the plate conveyor is comprised by a great many unit plates interconnected to form an endless chain, replacement of unit plates for different products requires not only much time and labour but also interruption of the operation of the glass bulb blowing machine, thus reducing its rate of operation.

It is an object of this invention to provide an improved chain link for a plate conveyor which permits easy replacement of unit plates with minimum time thus improving the rate of operation.

The chain link embodying this invention comprises a pair of vertically spaced and vertically aligned pin adapters and a connector between said pin adapters but laterally spaced therefrom. Thus, adjacent chain links can be interconnected to form a chain by interposing the connector of one chain link between pin adapters of the other and then inserting a pin through these aligned connector and pin adapters. The chain link is also provided with a supporting member for a removable unit plate, said supporting member being pivotally connected to the chain link about an axis extending in the direction of movement of the chain conveyor. The supporting member is provided with a pair of spaced ears including slots to receive one end of the unit plate and a spring biased locking member between said ears. Thus, depressing the locking member, the unit plate can be readily removed and replaced with a unit plate of different type.

The invention can be more fully understood from the following detailed description taken in connection with the accompanying drawing in which.

Figure 1:
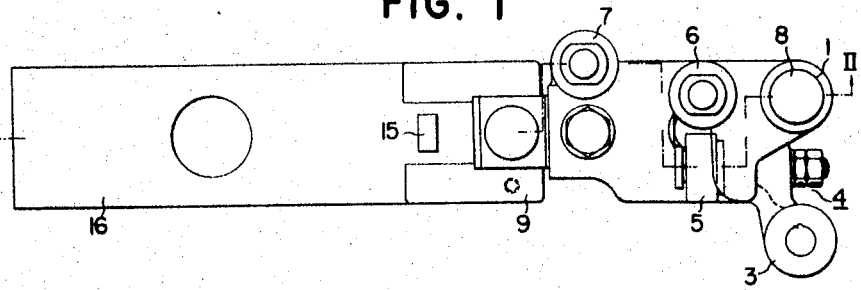
FIG. 1 is a plan view of a unit plate and chain link of a plate conveyor embodying this invention.
Figure 2:
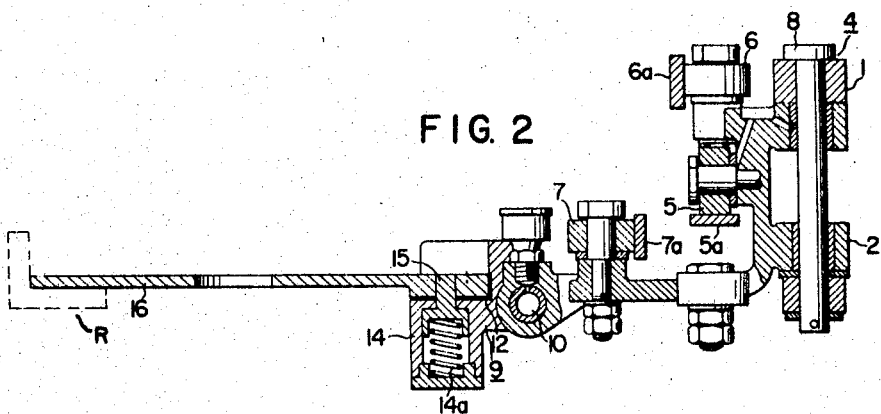
FIG. 2 shows a cross-section of the unit plate and chain link shown in FIG. 1, taken along a line II—II.

As shown in FIGS. 1 and 2, each chain link 4 of the plate conveyor comprises a pair of vertically spaced and vertically aligned pin adapters 1 and 2 and a connector 3 laterally offset from the pin adapters as shown in FIG. 1 but situated intermediate therebetween. Adjacent chain links are connected together to form an endless chain by inserting the connector of one link between the pin adapters of the other and then inserting a pin 8 through aligned openings of these adapters and connector. In the ribbon machine the endless chain conveyor is arranged with its upper and lower runs lying in the longitudinal direction of the machine.

Further, each chain link 4 includes a vertical roller 5 which cooperates with a rail 5a supported by a base plate, not shown, of the ribbon machine and horizontal rollers 6 and 7 cooperating with rails 6a and 7a, respectively, said rollers and rails serving to guide the chain conveyor.

Figure 3:
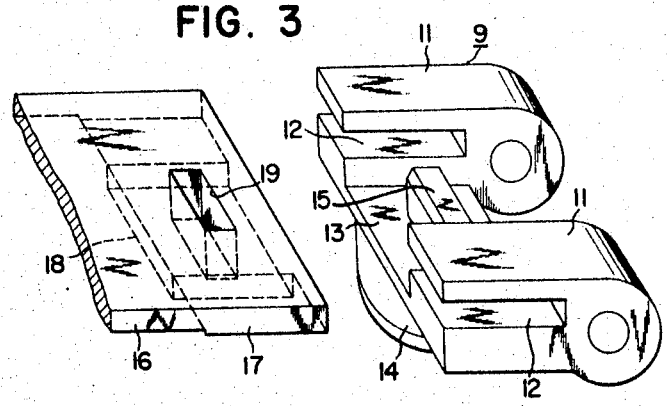
FIG. 3 is a perspective view of a portion of the unit plate and a supporting member therefor.

At the end of the chain link opposite the end of the pin adapters and connector, a unit plate supporting member 9 is pivoted as at 10 to be rotatable in a vertical plane. As best shown in FIG. 3, the supporting member 9 comprises spaced apart ears 11 adapted to embrace said opposite end of the link, each ear being provided with a notch or slot 12 to receive one end of a unit plate 16. Ears 11 are connected together by means of a bottom plate 13 supporting a cylinder 14. Cylinder 14 contains a spring 14a acting to urge upwardly a locking bar 15 of rectangular cross-section.

The thickness of one end 17 unit plate 16 is selected to snugly fit in slots 12 of the ear, and the portion of the bottom of the end 17 between the ears is projected as at 18 to a depth to engage bottom plate 13 when the unit plate is inserted in slots 12. The end 17 of the unit plate is formed with a slot 19 adapted to receive the locking bar 15. Thus, after insertion in slots 12, the unit plate 16 is locked in position by locking bar 15 which is urged to project through slot 19 by the action of spring 14a. Consequently, when it is desired to manufacture products of different type the unit plate can be readily removed with minimum time by merely depressing the locking bar 15 and then pulling the unit plate out of the slots 12, thus increasing the rate of operation of the blowing machine.

In the endless conveyor utilized in the so-called ribbon type glass bulb blowing machine, support members 9 and unit plates 16 supported thereby are maintained in the horizontal position by a suitable guide rail R (shown by the dotted lines in FIG. 2) cooperating with the left hand end of plates 16 while molten glass is supplied to the conveyor and parisons are blown but support members and unit plates 16 hang vertically when they are moved along the return path.

What we claim is:

1. A plate conveyor comprising a plurality of chain links, supporting members and unit plates, each of said chain links having a pair of vertically spaced and vertically aligned pin adapters and a connector intermediate said pin adapters laterally offset therefrom, means to connect said pair of pin adapters of one chain link to the connector of an adjacent chain link received between said pair of pin adapters, means to pivotally connect said supporting members to each one of said chain links about an axis extending in the direction of movement of said conveyor, each of said supporting members having a pair of spaced apart slots to receive one end of said unit plates and means to removably lock said unit plate in position.

2. The plate conveyor according to claim 1 wherein each of said supporting members are provided with a locking bar in parallel with said pivotal axis, said one end of each of said unit plates is provided with a slot adapted to engage said locking bar, and a spring is provided to urge said locking bar toward said slot.

References Cited

UNITED STATES PATENTS 1,734,814   11/1929   Leskawa _____ 198—189 X

FOREIGN PATENTS 209,655   8/1956   Australia.

EDWARD A. SROKA, Primary Examiner